United States Patent [19]
Trueet

[11] Patent Number: 5,444,247
[45] Date of Patent: Aug. 22, 1995

[54] SUBLIMATION APPARATUS AND PROCESS

[76] Inventor: William L. Trueet, Box 25, Rte. 35, Townshend, Vt. 05353-7702

[21] Appl. No.: 73,938
[22] Filed: Jun. 8, 1993
[51] Int. Cl.⁶ .................................... G01N 21/35
[52] U.S. Cl. .................. 250/339.12; 250/341.6; 23/294 R; 422/244
[58] Field of Search .......... 23/294 R; 219/432, 433; 422/244; 250/339, 341

[56] References Cited

U.S. PATENT DOCUMENTS

| | | | |
|---|---|---|---|
| 3,202,485 | 8/1965 | Armington et al. | 23/294 |
| 3,705,617 | 12/1972 | Miller et al. | 165/1 |
| 3,839,479 | 10/1974 | Hedge | 260/674 N |
| 3,840,349 | 10/1974 | McGhie | 23/273 F |
| 4,531,953 | 7/1985 | Grouse et al. | 55/74 |
| 5,201,985 | 4/1993 | Medvedieff | 156/609 |

*Primary Examiner*—Carolyn E. Fields
*Attorney, Agent, or Firm*—Herbert M. Wolfson

[57] ABSTRACT

A sublimation apparatus and process for separating solids and high boiling liquids are disclosed wherein a temperature gradient is imposed along the length of the vertically oriented, evacuated tube-shaped vessel or container and means for collecting and/or monitoring fractions of sublimate along the length of the sublimer vessel are provided.

5 Claims, 6 Drawing Sheets

SUBLIMATION APPARATUS AND PROCESS

FIELD OF THE INVENTION

This invention relates to a process and device for the separation of mixtures of solids and high boiling liquids. More particularly the invention relates to separating these mixtures by sublimation.

BACKGROUND OF THE INVENTION

The art of purification of solids, i.e. the separation of mixtures of solids is an ancient art in chemistry which was known to the alchemist. Although the process is greatly accelerated via being operated at reduced pressure and high temperature, the sublimation of ice from frozen surfaces in winter is well established. A number of glass devices are currently available from all glass companies which can be loaded with a small quantity of a material to be sublimed, the device suitably heated while under vacuum and the solids will collect in the upper cool portion. Such devices do not have provisions for a well defined thermal gradient within the device, nor is there provision for collecting fractions or for monitoring, via spectroscopic techniques, the progress of the process. As a result of these limitations, the glass sublimers are of limited value.

Another device widely used to separate mixtures of solids is HPLC (high performance liquid chromatography), which is very effective but the separated components of the mixture are obtained as dilute solutions. The solvents must be evaporated to give the desired solids. This means that large quantities of volatile solvents must be disposed of. By contrast, my invention is environmentally friendly and produces no solvent or gas to dispose of.

SUMMARY OF THE INVENTION

It is the purpose of my invention to furnish a device which has the capability of separating mixtures of solids and/or high boiling liquids into pure components via the process of sublimation. In order to carry out the process of sublimation expediently, a vessel closed at one end and loaded at the lower end with a sample to be sublimed is heated while a vacuum is applied. It is important that a temperature gradient is developed along the sublimation vessel and this can be done in several fashions. In the simplest fashion, this is done by placing a tubular sleeve which fits around the glass vessel used for the sublimation. A second method of achieving a thermal gradient along the sublimation vessel is to segmentally wrap resistance wire about the vessel and applying varying voltage to the segments. By contrast to my invention, the glass sublimers do not have a well controlled thermal gradient; hence, carrying out separations are relatively slow. They must be run at a higher temperature and do not give as precise separations.

An additional advantage of the invention is that the separation can be followed spectroscopically as it occurs. The brass sleeve about the vessel does possess two narrow slits which can be used to pass energy thru the sublimer vessel. UV, visible or IR light can be used by employing a corresponding wavelength spectrometer. A second alternative method of following the progress of the sublimation is to place a window of suitable spectroscopic material in the tube.

In addition to the above modifications to the sublimer vessel, it is also possible to place a fraction collector mechanism in the vessel. The simplest of these is to place glass tube segments in the sublimer vessel. At the completion of the sublimation, the glass segments are removed which contain the discrete solid fractions. A second method of collecting fractions is to place a piece of metal foil in the sublimer vessel; at the completion of the sublimation, the foil is removed and the fractions treated as desired.

A feature aimed at enhanced separations can be achieved by placing a cartridge filled with a suitable chromatographic material, such as silica, alumina, etc. and filter frit ends which will retain the chromatographic material but permit free flow of sublimed substances. This is a combination of chromatography and sublimation.

Devices combining several, or all of these features, can be used to give a very superior performance in the separation of solid mixtures.

In its broadest terms, the process and apparatus of my invention may be described, as follows:

A process of separating a mixture of solids or high boiling liquids comprising a) placing the mixture of at least two compounds, compounds A and B, compound A having a different sublimation temperature than compound B, in one end, the closed end, of a substantially cylindrical vessel;

b) simultaneously applying a vacuum through the open end of the vessel and applying heat to the vessel in such manner as to obtain a thermal gradient along the length of the vessel from its closed end to its open end; and c) monitoring for the appearance of sublimed compounds A and B along the length of the vessel from its closed end to the open end through which the vacuum is drawn.

Monitoring may be done visually by observing the infrared spectrum along the length of the vessel after correcting for the background spectrum of the wall of the vessel. Monitoring may also be done by collecting fractions of the sublimate along the length of the vessel on surfaces where the sublimate has condensed and then examining the surface by suitable spectroscopic or other techniques.

The apparatus comprises a tubular vessel having a closed and an open end; evacuating means sealing the open end; the closed end adapted to receive a mixture of at least two solids or high boiling liquids; means for heating the vessel to provide a thermal gradient along the length of the vessel or container and to cause the sublimation of the mixture; means to monitor the sublimation of the mixture by visual or optical means adapted to receive and translate the spectrum radiated from the sublimed materials along the length of the heated vessel or by physical means adapted to receive and retain the sublimed materials along the length of the heated vessel.

DETAILED DESCRIPTION OF THE INVENTION

Figure 1A:
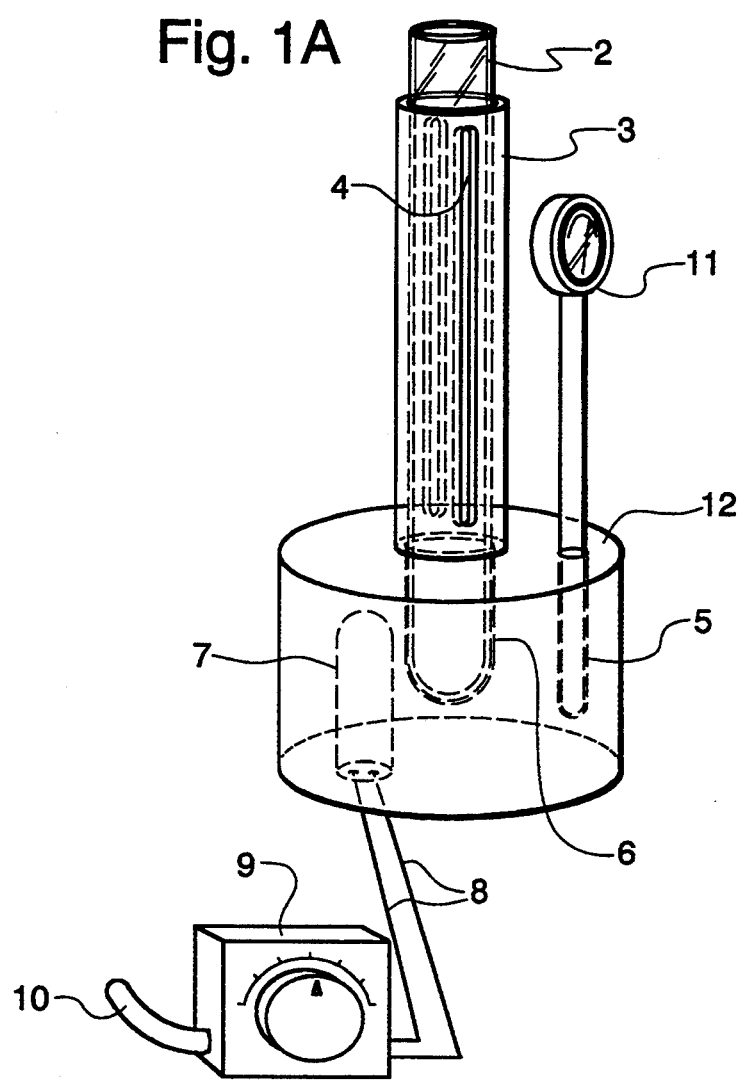
FIGS. 1A and 1B are schematic views of the preferred embodiment of the apparatus suitable to practice the present invention, possessing a metal sleeve to generate a thermal gradient, and slits in the metal sleeve to permit observations.

FIG. 1A depicts a device for the sublimation separation of mixtures consisting of a metal block, 12, containing two mounting wells, 5 and 6, one for the thermometer, 11, and one for the sublimer vessel, 2. The heating block also contains a cartridge heater, 7, in the base driven by a suitable AC transformer, 9, connected by line 8, to the heater and line, 10, to a 120V AC source. The line to a vacuum is joined to the sublimer vessel, 12, via rubber vacuum tubing. The metal sleeve, 3, has two slits, which permits the generation of a thermal gradient across the sublimer vessel, and permits passage of electromagnetic energy when it is desired to determine the spectrum of the sublimation fractions. This can be done at any time during the sublimation, or it may be done at the conclusion of the sublimation; thus, spectrum can be determined as desired.

Figure 1B:
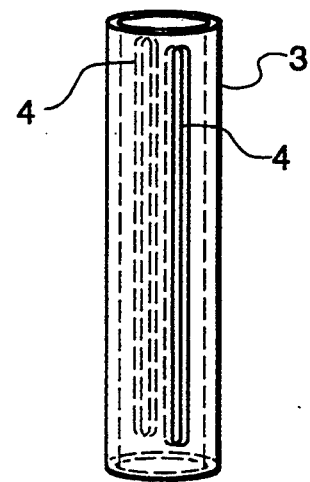

A more detailed view is given of the metal sleeve in FIG. 1B, showing clearly the two slits 4, in the sleeve, 3.

The sublimation device is utilized via placing a small sample at the bottom of the tube; vacuum and heating initiated; and the tube monitored via the slide slits for the appearance of fractions. If desired, the tube can be removed with the vacuum intact, placed in the sample compartment of a spectrometer and spectrum obtained. Alternatively, the glass tube may be cut into sections at the completion of the sublimation and the several fractions examined via IR techniques such as potassium bromide pellets, attenuated total reflectance, or in solution in transmission cells.

Figure 2:
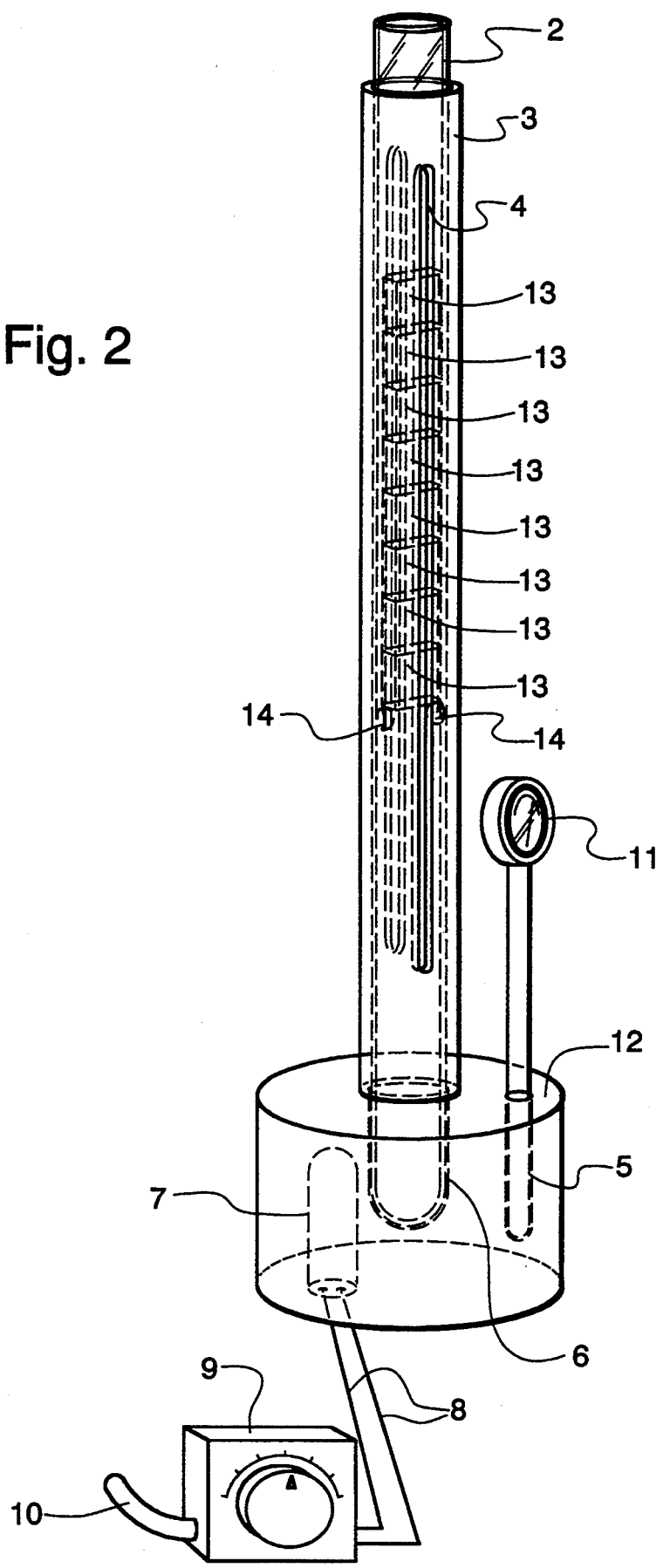
FIG. 2 is a schematic view of an apparatus suitable to practice the present invention, possessing segments within the sublimer vessel upon which sublimed fractions can condense.

FIG. 2 depicts a second version of the preferred embodiment. The device is similar to that shown in FIG. 1A except that the sublimer tube, 2, contains a number of segments of glass or other optical materials, 13, which are fitted into the tube, and held in place by indentations, 14, which hold the segments in the tube.

The tube is loaded with a solid mixture to be separated, and heat and vacuum applied. The course of the sublimation is followed via the slit in the metal sleeve; and, when complete, the heat and vacuum shut down and the segments carefully removed from the tube and examined directly as desired via spectroscopy.

Figure 3:
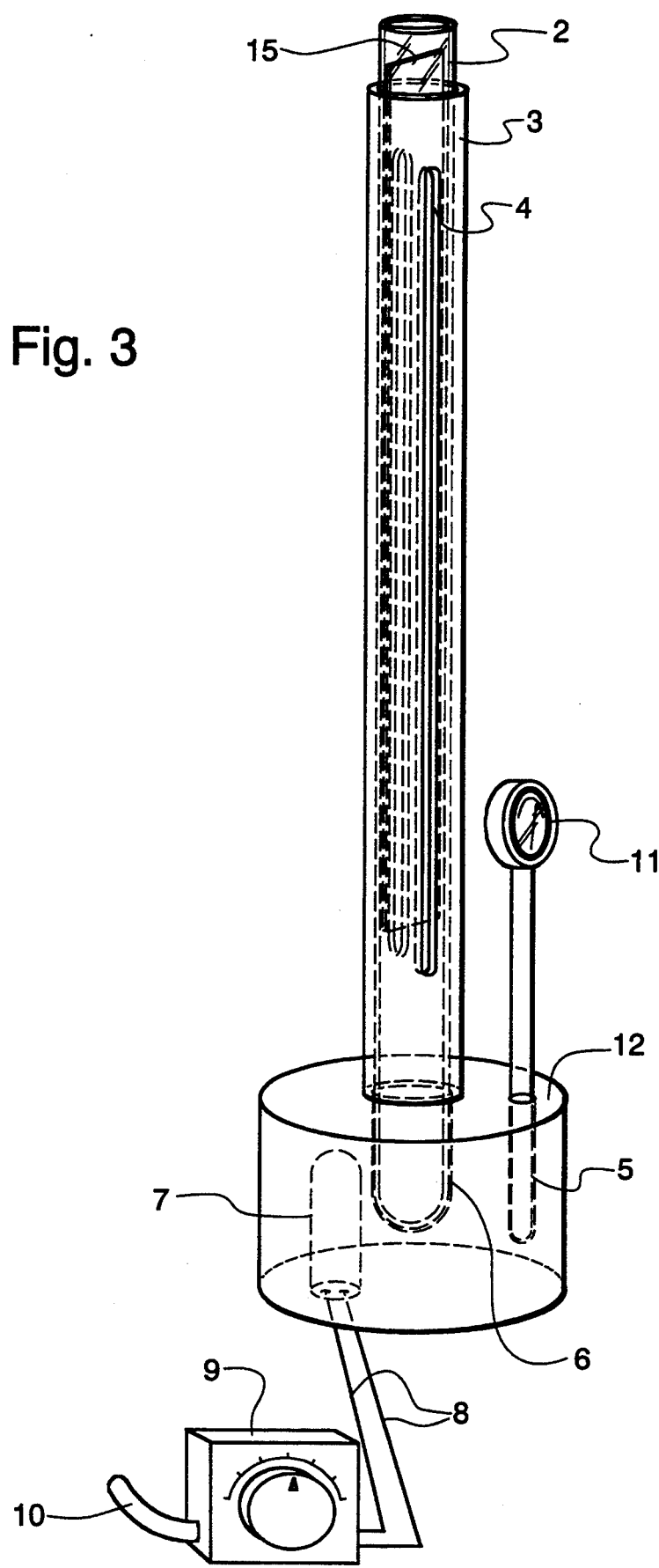
FIG. 3 is a schematic view of an apparatus suitable to practice the present invention, possessing a metal foil within the sublimer vessel upon which sublimed fractions can condense.

The version in FIG. 3 works basically the same as that in FIG. 1A and fractions are collected as in FIG. 2. In this version of the preferred embodiment, the sublimed material is collected upon a piece of metal foil, 15, which is inserted into an annular space of the sublimer vessel, 2. The metal foil, 15, need not fill the tube completely and should be inserted to coincide with the slit, 4, in the metal sleeve, 3, which is positioned around the tube, 2.

At the completion of the sublimation, the metal foil is carefully removed and the fractions of sublimate examined by the desired technique. If IR spectra are desired, they can be obtained directly via inserting the metal foil in a device used to determine specular reflectance spectra.

Figure 4:
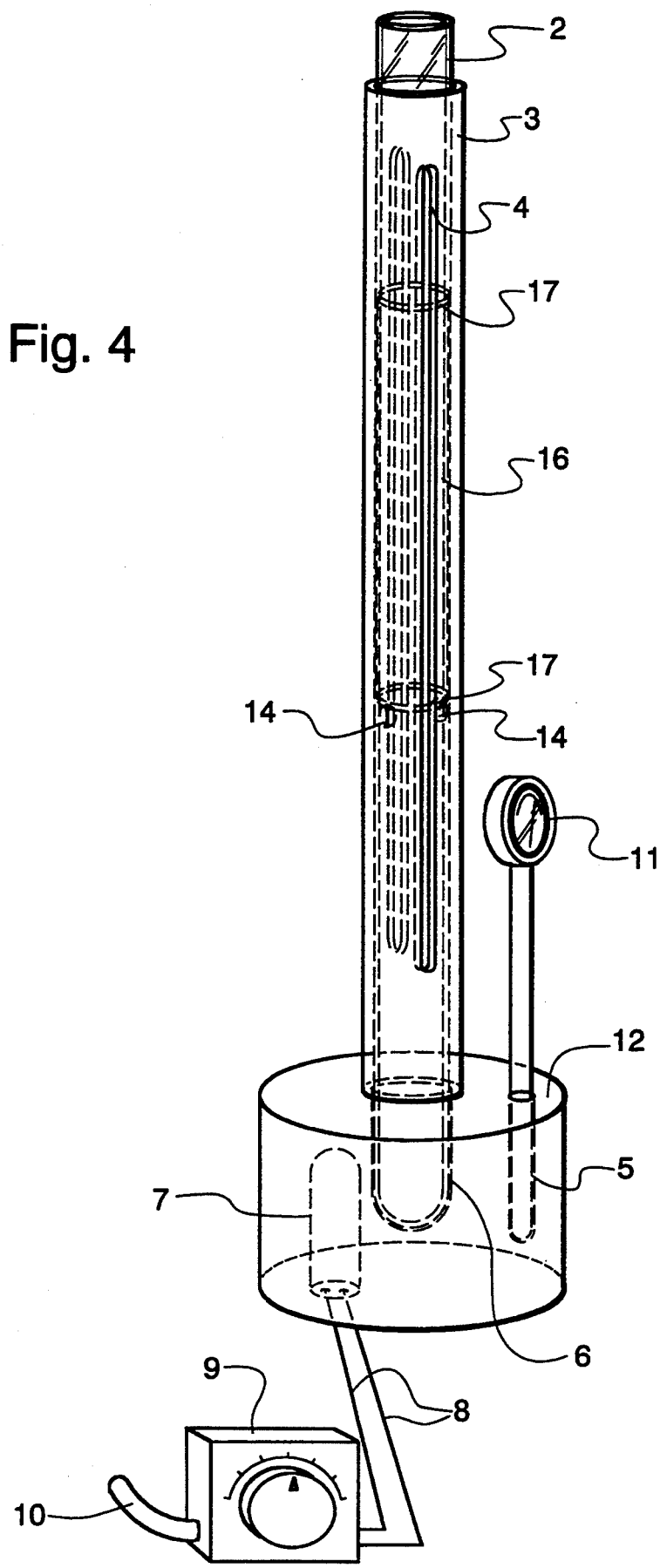
FIG. 4 is a schematic view of an apparatus suitable to practice the present invention, possessing a chromatographic cartridge to assist in the sublimation separation.

FIG. 4 depicts another version in which the dominant feature is the chromatographic cartridge, 16, in the sublimer vessel, 2, which together with its retainer rings, 17, held in place in part by a wall indentation, 14, in the sublimer tube. The remainder of this version is similar to the previous versions, with a sublimer vessel 2, surrounded by a metal sleeve to generate a thermal gradient and possessing view slits which can be utilized to follow the sublimation and to obtain spectrum if desired when the sublimation is in progress. The fractions sublimed will collect in that portion of the sublimer tube above the portion of the sublimer tube containing the chromatographic material. At the completion of the sublimation, the tube is removed from the device and the fractions examined as desired. Spectra may be obtained inside, or the tube can be broken and the samples examined by any desired technique.

In addition to the simple version shown in FIG. 4, the use of collector pieces as in FIG. 2 can be added to the portion of the sublimer tube above the chromatographic cartridge. Alternatively, the metal sleeve, internal, 15, can be used to collect the sublimation fractions.

Figure 5:
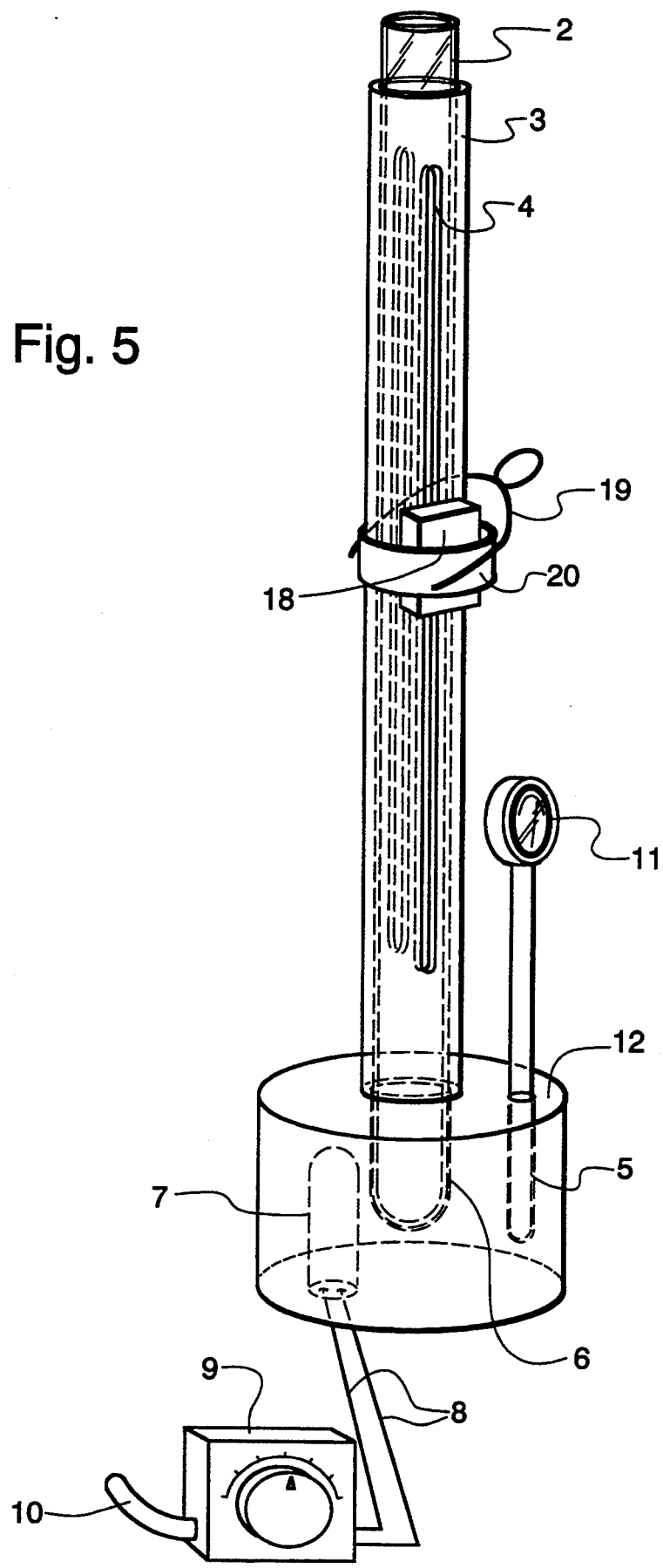
FIG. 5 is a schematic view of an apparatus suitable to practice the present invention, possessing an attenuated total reflectance crystal for collecting sublimed fractions.

FIG. 5 depicts another version in which the presence of an Attenuated Total Reflectance (ATR) crystal, 18, mounted on the side of the sublimer tube is the key element. The crystal is held against the sublimer tube, 2, by means of a gasket, 20, and a clamp, 19. The metal sleeve, 3, with a slit, 4, are essential to monitor the course of the sublimation. When during the course of the sublimation a fraction begins to condense on the ATR crystal, the sublimer vessel must be placed momentarily in the sample compartment of an FTIR (Fourier Transfer IR) spectrometer and in a suitable holder to position the ATR crystal in the IR energy beam in order that a spectrum can be obtained as the sublimation proceeds, this must be carried out several times.

Figure 6:
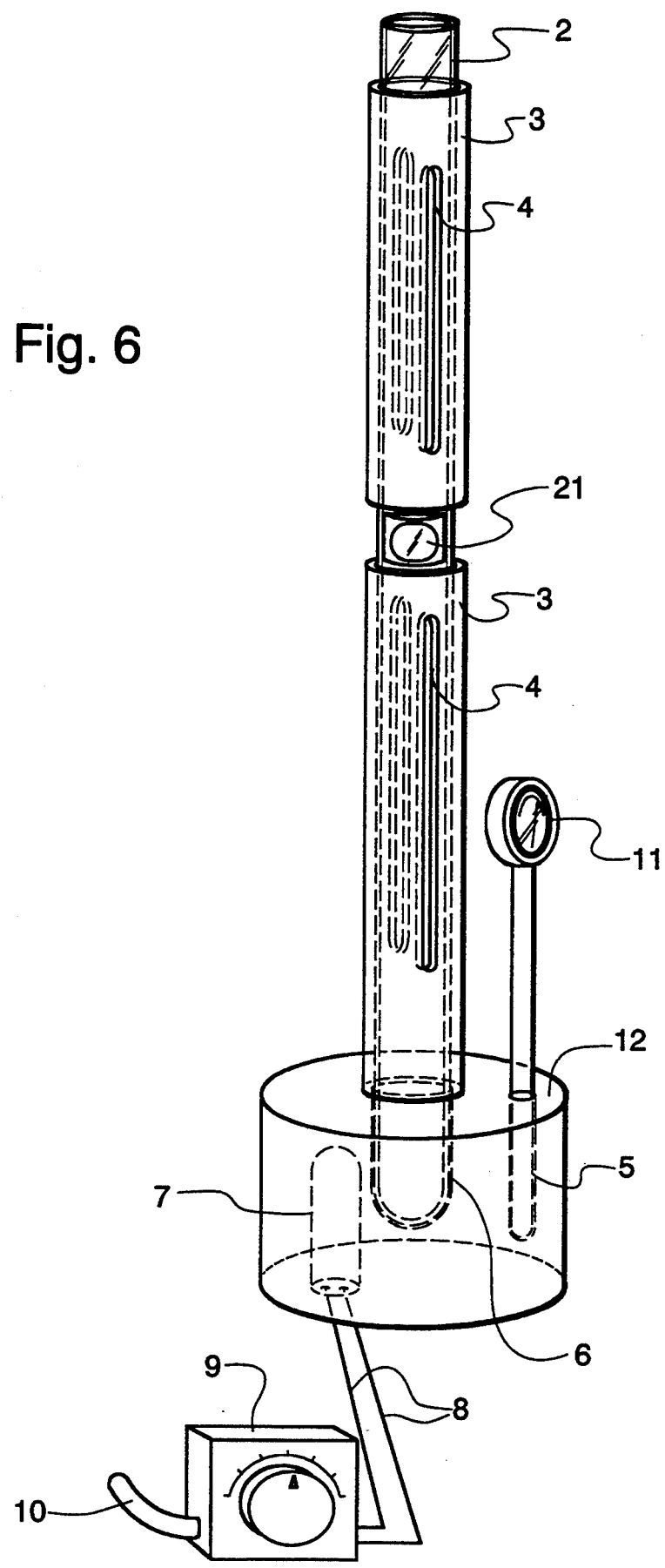
FIG. 6 is a schematic view of an apparatus suitable to practice the present invention, having a transmission window to permit the determination of IR spectra of the sublimed fractions.

FIG. 6 depicts another version in which the dominant feature is an IR transmission window, 21, which is glued to the sublimer tube, 2. The metal sleeve, 3, is used to assure a thermal gradient is present, as are slits, 4, to observe the progress of the sublimation. When a material condenses on the window, an IR spectrum must be determined by placing the tube in the sample compartment of the FTIR spectrometer in a holder which makes possible the determination of a transmission spectrum. As the sublimation continues, this process must be repeated several times. The remainder of the apparatus is the same as FIG. 1A with heated block, 6, thermometer, 11, and cartridge heater, 7.

In summary, the invention involves a device to carry out the sublimation process under vacuum with heating which consists of a vessel 2 closed at one end, heated at the closed end and heated along its length in a gradient fashion which is achieved by use of a metal sleeve 3 in contact with the heated zone of said device. The sleeve possesses slits 4 at opposite sides of the sleeve to permit the passage of light of suitable wavelengths in order to monitor the course of the sublimation via suitable spectroscopic techniques such as ultraviolet, visible light, near infrared or infrared spectroscopy achieved by placing said sublimer device in the sample compartment of an appropriate spectrometer and observing the progress of the sublimation, or the sublimer device can be examined at the conclusion of the sublimation, or alternatively, the sublimer tube can be split into sections and each section evaluated. Other means of monitoring the course of the sublimation device with windows permitting the passage of the desired electromagnetic radiation, or the sublimer device may be fitted with an attenuated total reflectance (ATR) window for monitoring, or fractions of the sublimed materials may be collected within the sublimer tube during the course of the sublimation by placing segments of glass within said shapes of transparent optical materials upon which the sublimed material will condense and can be removed from the sublimer device past sublimation and examined via suitable spectroscopic techniques.

The above process may be assisted via placing in the sublimer apparatus a chromatographic material consisting of any of the well known chromatographically active materials. Additionally, fractions of the sublimed materials can be collected upon a metal foil placed in the upper cooler portion of the sublimer device and then examined by suitable techniques. The sublimer device can be fabricated from a number of materials, such as glass, quartz, alumina, fluorocarbon polymers which are transparent at various wavelengths in the electromagnetic spectrum.

In one preferred embodiment, the sublimation apparatus is surrounded by a slotted metal sleeve in contact with the heated zone of the device. The sleeve is slotted in such a fashion that light of suitable wavelengths can be passed through said device to monitor the progress of the sublimation process via placement of said device in the sample compartment of a spectrometer.

In another embodiment, the sublimation device is surrounded by a slotted metal sleeve in contact with the heated zone of the device and two radiant energy windows transparent to IR energy are placed in the sublimation device to facilitate the monitoring of the progress of the sublimation process via placement of the device in the sample compartment of an FTIR spectrometer.

In another embodiment, the sublimation device is surrounded by a slotted metal sleeve in contact with the heated zone of the device and an attenuated total reflectance plate is placed in the sublimation device to facilitate the monitoring of the progress of the sublimation process via placement of the device in the sample compartment of an FTIR Spectrometer.

In still another embodiment, the sublimation device is surrounded by a slotted metal sleeve in contact with the heated zone of the device, and segments of optical materials such as glass, quartz, sodium chloride, potassium bromide, and the like are placed inside the sublimation device. Upon these segments, sublimed fractions will condense. At the conclusion of the sublimation process the segments are removed from the device and examined by means of a suitable spectrometer in order to identify the sublimed fractions.

In another embodiment, a suitable chromatographic material such as alumina, silica clay, activated carbon, or the like is placed in the sublimer device in order to assist in the separation of the materials sublimed in the device.

In another embodiment, a metal foil is inserted into the sublimation device upon which sublimed fractions can condense. This permits their ready examination after the conclusion of the sublimation process via the use of specular reflection with FTIR spectrometers.

What is claimed is:

1. An apparatus comprising a tubular vessel having a closed and an open end; evacuating means sealing the open end; said closed end adapted to receive a mixture of at least two solids or high boiling liquids; means for heating said vessel to provide a thermal gradient along the length of said vessel and to cause the sublimation of said mixture; means to monitor the sublimation of said mixture by optical means adapted to receive and translate the spectrum transmitted through the sublimed materials along the length of the heated vessel.

2. Apparatus as in claim 1 wherein the means for heating comprises a metal sleeve encompassing said tubular vessel, said sleeve having slits at opposite sides of the sleeve to permit passage of light therethrough.

3. Apparatus as in claim 2 wherein two radiant energy windows transparent to IR energy are placed in said vessel to facilitate the monitoring of the progress of the sublimation process.

4. Apparatus as in claim 2 wherein an attentuated total reflectance plate is placed in said vessel to facilitate the monitoring of the progress of the sublimation process.

5. Apparatus as in claim 2 wherein segments of optical materials selected from glass, quartz, sodium chloride or potassium bromide, are placed longitudinally within said vessel.

* * * * *